United States Patent [19]

Omagari

[11] Patent Number: 4,552,131
[45] Date of Patent: Nov. 12, 1985

[54] CO-VIEWING DEVICE FOR ENDOSCOPE

[75] Inventor: Yasuhiko Omagari, Tokyo, Japan

[73] Assignee: Olympus Optical Co., Ltd., Tokyo, Japan

[21] Appl. No.: 622,189

[22] Filed: Jun. 19, 1984

[30] Foreign Application Priority Data

| Jun. 24, 1983 | [JP] | Japan | 58-112640 |
| Jun. 24, 1983 | [JP] | Japan | 58-112641 |
| Jun. 24, 1983 | [JP] | Japan | 58-112642 |

[51] Int. Cl.⁴ .............................................. A61B 1/06
[52] U.S. Cl. ........................................................ 128/6
[58] Field of Search ..................... 128/4, 5, 6, 7, 8, 9, 128/10, 11

[56] References Cited

U.S. PATENT DOCUMENTS

| 2,699,770 | 1/1955 | Fourestier et al. | 128/6 |
| 4,157,216 | 6/1979 | Plummer | 128/6 X |
| 4,283,115 | 8/1981 | Fraissl | 128/4 X |
| 4,369,767 | 1/1983 | Shishido | 128/6 |
| 4,407,272 | 10/1983 | Yamaguchi | 128/6 |
| 4,478,212 | 10/1984 | Asano | 128/6 |

Primary Examiner—William H. Grieb

[57] ABSTRACT

A co-reviewing device has a body having a connecting portion detachably connected to the eyepiece section of an endoscope, and having a main eyepiece section to which a photographing device can be connected. A sub-eyepiece section is connected to the body. A support frame 21 supporting a half prism and a transmitting prism is arranged in the body to be movable between a first position where the half prism is on the optical axis of the beam, which is sent from the endoscope into the body, to divide the beam and guide the divided beams into the main and sub-eyepiece sections, and a second position where the transmitting prism is on the optical axis to guide all of the beam to the main eyepiece section. A changeover mechanism is arranged in the body to engage with the support frame and to be engageable with the photographing device. The changeover mechanism switches the support frame to its second position, in accordance with the operation of connecting the photographing device to the main eyepiece.

11 Claims, 9 Drawing Figures

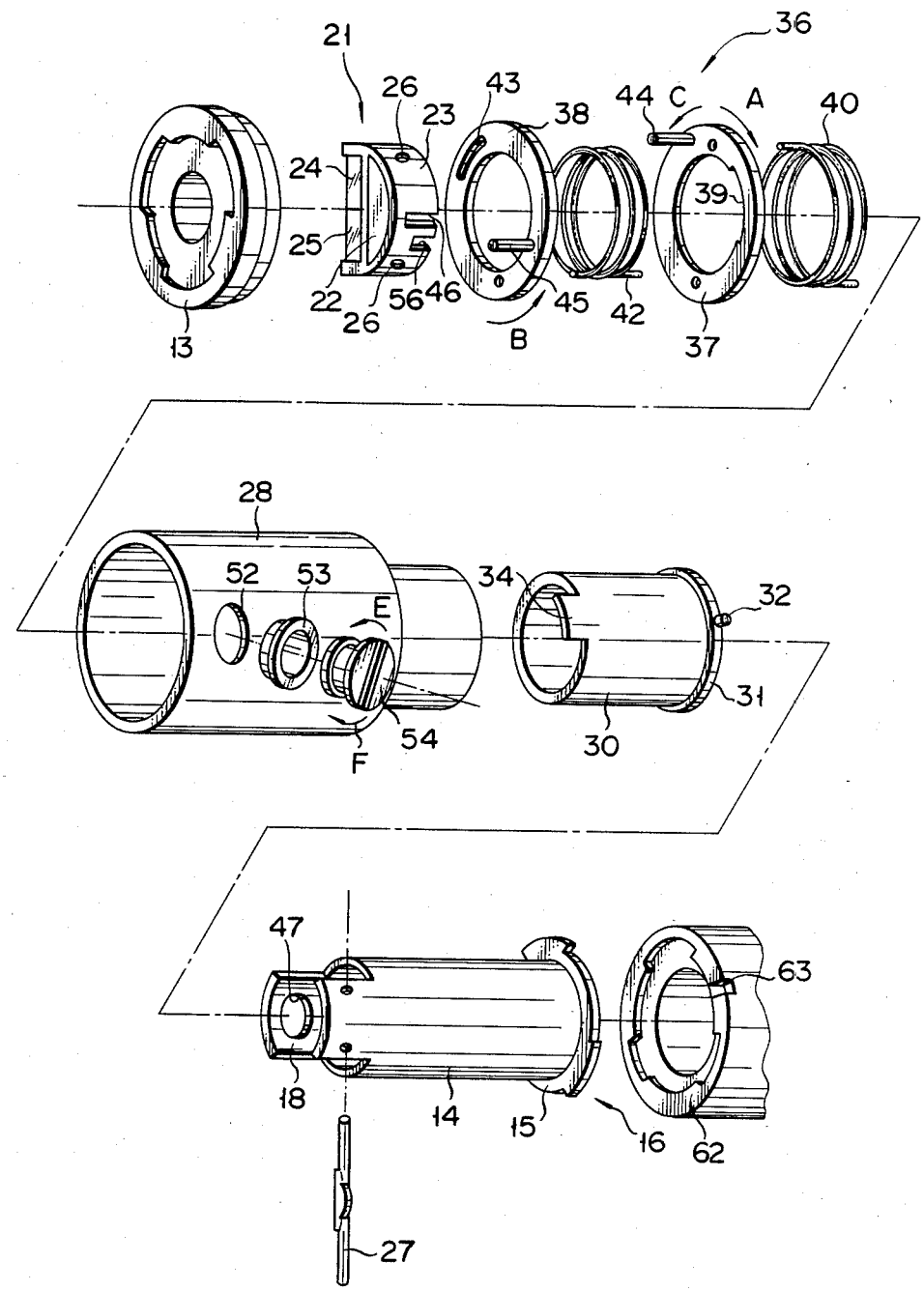

CO-VIEWING DEVICE FOR ENDOSCOPE

BACKGROUND OF THE INVENTION

The present invention relates to a co-viewing device for endoscopes to which the photographing device can be connected.

The conventional co-viewing device to be attached to the eyepiece section of the endoscope has a body provided with a main eyepiece section, and a sub-eyepiece section attached to the foremost end of a flexible pipe extending from the body, thereby allowing two persons to make observations through these eyepiece sections at the same time. Light dividing means comprising a half prism is housed in the body to divide a light beam sent from the endoscope and to introduce a part of the light beam to the main eyepiece section and the remainder to the sub-eyepiece section.

The main eyepiece section is formed to allow the photographing device to be attached thereto, and images sent from the endoscope can be photographed by the photographing device attached to the main eyepiece section. In the case where the light beam sent from the endoscope is divided for the main- and sub-eyepiece sections as described above, however, the amount of light needed for photographing is not sufficient in both of the eyepiece sections, thereby making it impossible to obtain bright images even when photographed by the photographing device attached to the main eyepiece section.

SUMMARY OF THE INVENTION

The present invention is intended to eliminate the above-mentioned drawback, and the object of the present invention is therefore to provide a co-viewing device for endoscopes capable of supplying a sufficient amount of light to the photographing device at the time of photographing.

The object of the present invention can be achieved by a co-viewing device comprising a body having a connecting portion detachably connected to the eyepiece section of the endoscope and a main eyepiece section to which the photographing device can be attached; a sub-eyepiece section connected to the body and located remotely from it; light guiding means having light dividing and transmitting members and arranged in the body to be movable between a first position where the light dividing member is on the optical axis of the beam, which is sent from the endoscope to the body, to divide the beam and guide the two parts to both of the main- and sub-eyepiece sections, and a second position where the light transmitting member is on the optical axis to guide all the beam to the main eyepiece section; and a changeover means located in the body to engage with the photographing device and serving to change the light guiding means to the second position in association with the attaching operation of the photographing device to the main eyepiece section.

According to the co-viewing device having such an arrangement as described above, the light guiding means is switched to the second position in association with the attaching operation of the photographing device when it is attached to the main eyepiece section, so that the light transmitting member can be positioned on the optical axis of beam sent from the endoscope. All of the beam is thus guided to the main eyepiece section without being reflected and entered into the photographing device. Even when the photographing device is connected to the endoscope through the co-viewing device, therefore, a sufficient amount of light can be supplied to the photographing device, thereby enabling bright images to be obtained.

BRIEF DESCRIPTION OF THE DRAWINGS

FIGS. 1 through 5 show a co-viewing device according to one embodiment of the present invention, in which FIG. 1 is a side view showing the whole of the endoscope, co-viewing device, and photographing device, FIG. 2 is an exploded perspective view of the co-viewing device, FIG. 3 is a longitudinal sectional view of the co-viewing device, FIG. 4 is a sectional view taken along a line IV—IV in FIG. 3, and FIG. 5 is a view schematically showing an optical system of the co-viewing device;

DETAILED DESCRIPTION OF THE PREFERRED EMBODIMENTS

Some of embodiments of the present invention will be described in detail referring to the accompanying drawings.

Figure 1:
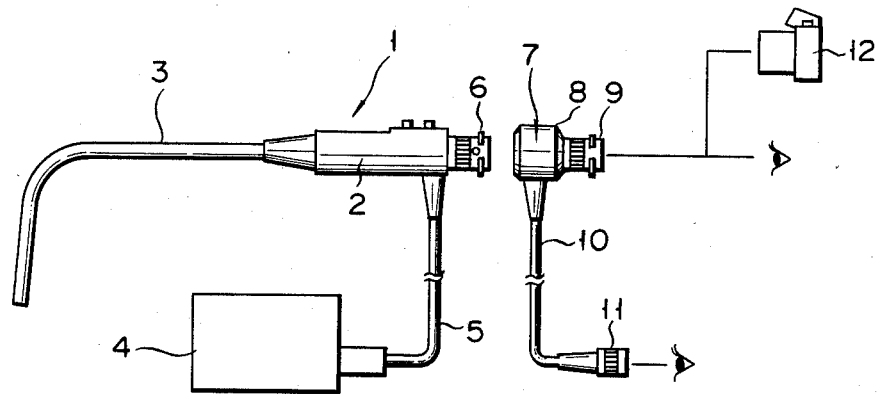
Figure 3:
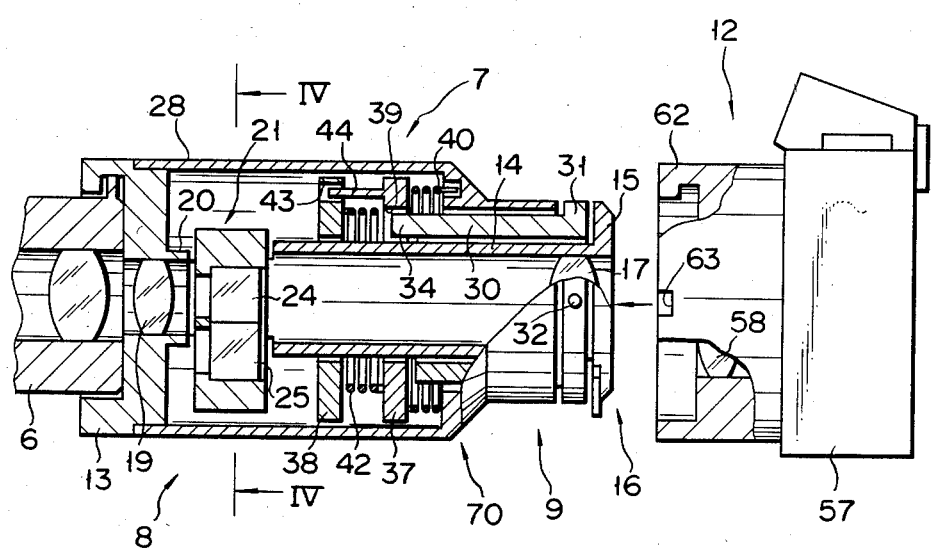

As shown in FIG. 1, an endoscope 1 has an operating section 2, an inserting section 3 extending from the operating section 2, and a universal cord 5 extending from the section 2 and connected to a light source device 4. Provided at one end of the operating section 2 is an eyepiece section 6 to which a co-viewing device 7 can be attached. The co-viewing device 7 has a body 8 having a main eyepiece section 9, and a sub-eyepiece section 11 connected to the body through a flexible pipe 10. A photographing device 12 can be attached to the main eyepiece section 9.

The co-viewing and photographing devices 7 and 12 will be described in detail referring to FIGS. 2 through 5. The body 8 has a ring-shaped connector 13 of a bayonet type detachably attached to the eyepiece section 6 of the endoscope 1. A lens 19 is housed in the inner hole of the connector 13. The connector 13 also has a ring-shaped support portion 20 projected rightward from the circumference of the inner hole. Fitted onto the support portion 20 is one end of a connecting sleeve 14 which extends coaxially with the connector 13. The connecting sleeve 14 has a flange 15 at the other end thereof, and this flange 15 forms a fixture 16 of a bayonet type. An eyepiece lens 17 is also arranged inside the other end of the connecting sleeve 14. The connecting sleeve 14 has a rectangular hole penetratingly formed at the one end thereof and perpendicular to the axis thereof. A prism support frame 21 is arranged in the rectangular hole 18 to freely move up and down along a direction perpendicular to the connecting sleeve 14. The support frame 21 is made in a semicircular shape, having a flat portion 22 idly fitted into the rectangular hole 18 and an arc portion 23 extending along the outer circumference of the connecting sleeve 14 from both ends of the flat portion. A half prism 24, which serves as light dividing member, and a transmitting prism 25 are fixed to the flat portion 22 and juxtaposed in the rectangular hole 18 along a direction perpendicular to the axis of the connecting sleeve 14. Guide holes 26 are formed at both ends of the arc portion 23, and a guide pin fixed to the connecting sleeve 14 and projecting therefrom is inserted into the guide holes 26. The support frame 21 is thus supported to be movable along the guide pin 27 between a first position, where the half prism 24 is on the optical axis of the beam which enters from the endoscope 1 into the body 7, and a second position, where the transmitting prism 25 is on the optical axis.

One end of a cylindrical housing 28 is fixed to the connector 13. The housing 28 extends coaxial with the connecting sleeve 14 and covers substantially the whole of the connecting sleeve, support frame 21, etc.

An interlocking cylinder 30 is rotatably fitted onto the connecting sleeve 14. The interlocking cylinder 30 has a flange 31 formed at one end thereof, which is located between the flange 15 of the connecting sleeve 14 and the other end of the housing 28. Therefore, the outer circumferential face of the flange 31 is exposed outside the housing 28 and an engaging pin 32 is projected from the outer circumferential face. A projection 34 is projected from the other end of the interlocking cylinder 30 along the axis thereof.

A clutch mechanism 36 is arranged between the prism support frame 21 and the interlocking cylinder 30. The clutch mechanism 36 has first and second rings 37 and 38 rotatably fitted onto the connecting sleeve 14. A receiving recess 39 is formed on the inner circumferential face of the first ring 37, extending along the circumferential direction thereof, and the projection 34 of the interlocking cylinder 30 is inserted into the receiving recess. A first torsion spring 40 is arranged around the connecting sleeve 14 between the first ring 37 and the housing 28 to urge the first ring in a direction shown by an arrow A in FIG. 2. The second ring 38 is located between the first ring 37 and the support frame 21. A second torsion spring 42 is arranged around the connecting sleeve 14 between the first and second rings 37 and 38 to urge the second ring 38 in a reverse direction to that of the first urged ring, that is, in a direction shown by an arrow B in FIG. 2. An elongated pin-receiving groove 43 is formed in the second ring 38, extending along the circumferential direction thereof, and a pin 44 projecting from the first ring 37 is inserted into this groove. The second ring 38 has a changeover pin 45 extending toward the support frame 21, and this changeover pin is engaged with a recess 46 formed in the arc portion 23 of the support frame. The interlocking cylinder 30 and the clutch mechanism 36 form a changeover means 70 in the case of the present invention.

Figure 4:
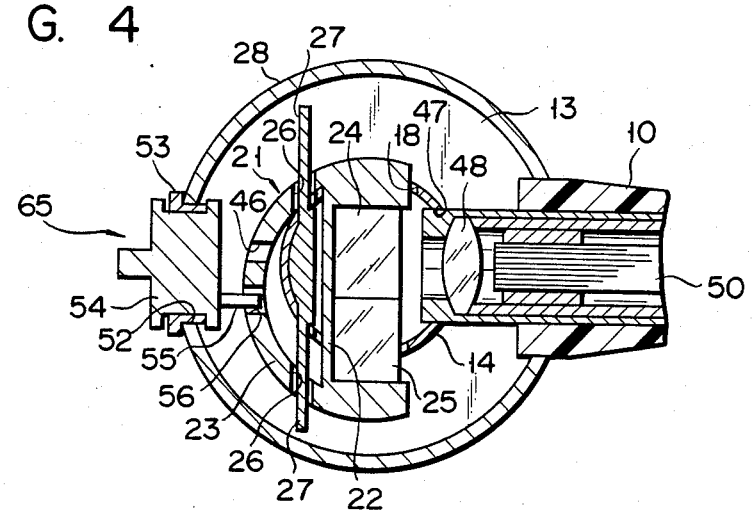
Figure 5:
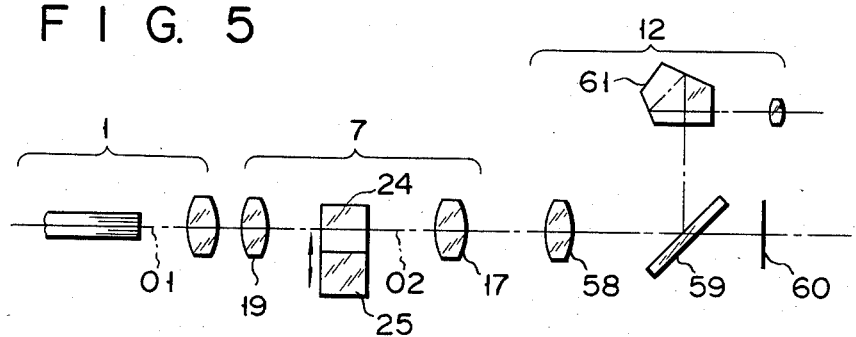

As apparent from FIG. 4, the base end of the flexible pipe 10 is inserted into a hole 47 in the connecting sleeve 14, passing through the housing 28, and opposed to the flat portion 22 of the support frame 21. A lens 48 is located inside the flexible pipe 10 and a light guide cable 50 extends therethrough.

A hole 52 is formed passing through the housing 28 and opposing the arc portion 23 of the prism support frame 21, and a receiving ring 53 is fitted and fixed in this hole. A changeover knob 54 is rotatably inserted into the receiving ring 53. This knob 54 has an operating pin 55 eccentrically positioned, projected inward, and engaged with a recess 56 formed at the arc portion 23 of the support frame 21. The knob 54 is rotated to move the support frame 21.

The photographing device 12 is a camera for the endoscope, and an objective 58, mirror 59, film 60, prism 61, etc., are housed in a body 57 of this camera. A connector 62 of the bayonet type is provided at the front end portion of the camera body 57 and detachably attached to the fixture 16 of the co-viewing device 7. Further, an engaging groove 63, which is engaged with the engaging pin 32 of the interlocking cylinder 30 when the connector 62 is attached to the co-viewing device 7, is formed at a part of the connector 62.

The operation of the co-reviewing device having the above construction will be described.

When the connector 13 of the co-viewing device is connected to the eyepiece section 6 of the endoscope 1, the optical axis $O_2$ of the co-viewing device 7 coincides with the optical axis $O_1$ of the eyepiece section 6. The prism support frame 21 is usually at the first position, and the half prism 24 crosses the optical axis $O_2$. Therefore, a part of the beam which enters from the endoscope 1 into the co-viewing device 7 penetrates through the prism half 24 and enters into the main eyepiece section 9, while the remainder thereof is reflected by the half prism and enters into the sub-eyepiece section 11 through the flexible pipe 10. In a case where the photographing device 12 is attached to the co-viewing device 7 under the condition that the co-viewing device 7 has been attached to the endoscope 1 to photograph images observed, the connector 62 of the camera body 57 is attached to the fixture 16 of the co-viewing device 7. When the connector 62 is fitted onto the fixture 16 in this case, the engaging groove 63 positioned on the side of the camera body is engaged with the interlocking pin 32 on the side of the co-viewing device 7. When the camera body is rotated to achieve a bayonet connection between the fixture 16 and the connector 62 of the camera body 57, therefore, the rotating force is transmitted to the interlocking cylinder 30 through the interlocking pin 32. When the interlocking cylinder 30 is rotated, the rotating force is transmitted to the first ring 37 through the projection 34 and its receiving recess 39 to rotate the first ring, in a direction shown by an arrow C in FIG. 2, against the urging force of the first spring 40. The pin 44 is thus moved along the pin-receiving groove 43 in the direction C, and the second ring 38 is followed and rotated by the urging force of the second spring 42 in the same direction C. When the second ring 38 is rotated, the rotating force is applied to the prism support frame 21 through the pin-receiving groove 39 engaged with the changeover pin 38. Since the immobile guide pin 27 is idly inserted into the holes 26 of the support frame 21, the support frame 21 is caused to linearly rise along the guide pin when the rotation force is applied to the frame 21 from its outer circumference. Namely, the rotation of the camera body 57 is converted to linear movement, and the support frame 21 is raised to the second position. The transmitting prism 25 is thus opposed to the optical axis $O_2$ of the co-viewing device 7. Accordingly, all of the beam which enters from the eyepiece section 6 of the endoscope 1 into the co-viewing device 7 is transmitted through the prism 25, entered into the main eyepiece section 9, and then guided to the photographing device 12. As the result, an amount of light sufficient for photographing can be obtained at the photographing device 12 to thereby enable bright photos to be taken.

When the photographing is finished and the camera body 57 is reversely rotated to detach it from the co-viewing device 7, the interlocking cylinder 30 is also reversely rotated. Therefore, the reverse rotating force is applied to the prism support frame 21 through the changeover pin 45 and the pin-receiving recess 46, and the support frame is caused to move to the first position. The half prism 24 is thus opposed to the optical axis $O_2$ of the co-viewing device 7 and viewing can be allowed again through the main- and sub-eyepiece sections 9 and 11 at the same time.

When the changeover knob 54 is rotated in a direction shown by an arrow E in FIG. 2 under the condition that the photographing device 12 is not attached to the co-viewing device 7, the rotation force is transmitted to the recess 56 through the operating pin 55. Therefore, the prism support frame 21 is guided by the guide pin 27 and linearly raised to the second position. The transmitting prism 25 is thus opposed to the optical axis $O_2$ similar to the above-described case, thereby enabling all of the beam entering from the eyepiece section 6 of the endoscope to be guided to the main eyepiece section 9. The second and first rings 38 and 31 rotate this time as the prism support frame 21 moves up, but the interlocking cylinder 30 does not rotate because the projection 34 moves in the recess 39.

When the changeover knob 54 is turned in a direction shown by an arrow F in FIG. 2 under the condition that the photographing device 12 is attached to the co-viewing device 7, as described above, the rotation force is transmitted to the support frame 21 through the operating pin 55 and the recess 56. Therefore, the prism support frame 21 is guided by the guide pin 27 to linearly fall to the first position, and the half prism 24 is opposed to the optical axis $O_2$, thereby enabling a part of the beam entering from the eyepiece section 6 of the endoscope to be guided to the eyepiece section 11, too.

As described above, viewed images can be guided to the sub-eyepiece section 11 even when the photographing device 12 is attached to the co-viewing device 7, and all of the beam which enters from the eyepiece section 6 of the endoscope can be guided to the main eyepiece section 9 even when the photographing device 12 is detached from the co-viewing device 7.

According to the co-viewing device 7, the prism support frame 21 is moved, in association with the operation of attaching the photographing device to the co-viewing device, and the transmitting prism is automatically positioned on the optical axis of the co-viewing device, as apparent from the above. Even when the photographing device is further attached to the co-viewing device under the condition that the co-viewing device has been attached to the eyepiece section of the endoscope, a sufficient amount of light can be supplied for the photographing. Since the prism support frame can be moved by hand, all of the incident beam can be guided to the main eyepiece even without the photographing device attached, and the incident beam can be guided to the sub-eyepiece section with the photographing device attached, thereby enabling the detachment of the co-viewing and photographing devices to be omitted and the co-viewing and photographing operations to be made easier.

Figure 6:
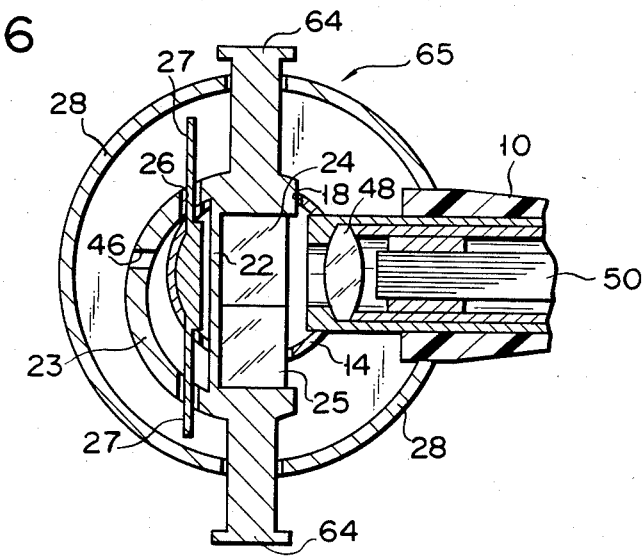
FIG. 6 is a sectional view, similar to FIG. 4, showing a modification of the operating means.

Although the operating knob 54 has been used as the external operating means 65, which can operate the prism support frame 21 independent from the changeover means 70 in the case of the above-described embodiment, the operating means may be arranged as shown in FIG. 6. According to this variation, the operating means 65 has operating buttons 64 projecting from both ends of the arc portion 23 of the prism support frame 21 and extending vertically to pass through the housing 38. The prism support frame 21 is changed directly by the buttons 64 in this case.

Figure 7:
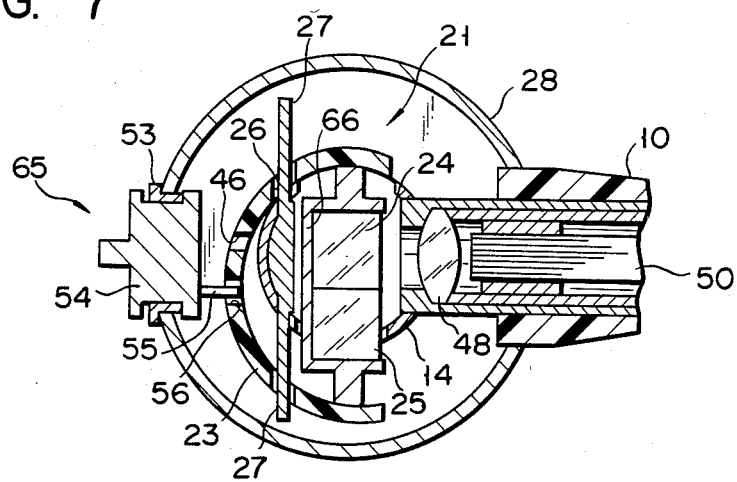
FIG. 7 is a sectional view, similar to FIG. 4, showing a modification of the light guiding means.

FIG. 7 shows a variation of the prism support frame 21. The support frame 21 has the semi-circular arc portion 23 made of elastic synthetic resin or the like, and a frame 66 for supporting the half prism 24 and the transmitting prism 25. The frame 66 is elastically held between both ends of the arc portion 23. In the case where the arc portion 23 is made of elastic material like this, any positional shift can be absorbed by the elastic deformation of the arc portion even when the arc portion is shifted in a position relative to the connecting sleeve 14, frame 66, and the like. The prism support frame 21 can be thus moved smoothly without being wrongly operated, and manufactured at a low cost without such a high processing accuracy being required.

Figure 8:
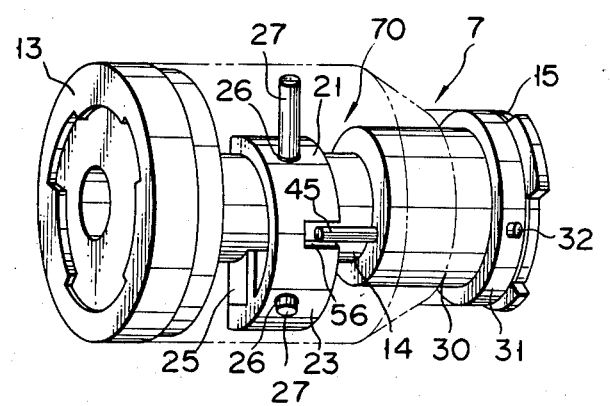
FIG. 8 is a perspective view showing a co-viewing device according to a second embodiment of the present invention.

FIG. 8 shows a second embodiment of the present invention. According to this embodiment, the changeover means 70 has no clutch mechanism, but the interlocking cylinder 30 is engaged directly with the prism support frame 21. The interlocking cylinder 30 has a changeover pin 45 projecting from its end face, which is opposed to the support frame 21, and this changeover pin 45 is fitted into the recess 46 formed in the arc portion 23 of the prism support frame 21. No external operating means is provided.

According to this embodiment, the prism support frame 21 is automatically changed over to the second position, in association with the attaching operation of the photographing device, similar to the case of the first embodiment. Even when the photographing device is connected to the endoscope through the co-viewing device 7, a sufficient amount of light is allowed to enter for the photographing. In addition, the second embodiment can be made simpler in construction when compared with the first embodiment.

Figure 9:
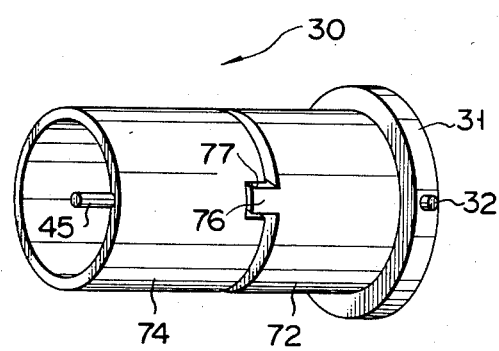
FIG. 9 is a perspective view showing a variation of the connecting sleeve.

In the case of the second embodiment, the interlocking cylinder 30 may be divided to first and second portions 72 and 74, as shown in FIG. 9. The first portion 72 positioned on the side of the photographing device is made of a very strong material such as iron, for example, and the second portion 74 positioned on the side of the prism support frame 21 is made of a light material such as plastic and aluminum, for example, thereby enabling the whole of the interlocking cylinder 30 to be made lighter in weight. When a projection 76 on the first portion 72 is engaged with a recess 77 in the second portion 74, the rotation of the first portion can be transmitted to the second portion, and the rotating force, as a twisting and flapping force, caused at the time of attaching the photographing device does not adversely effect the rotation of the interlocking cylinder 30.

What is claimed is:

1. A co-viewing device, which can be connected to the eyepiece section of an endoscope and to which a photographing device can be connected, comprising:
   a body having a connecting portion detachably connected to the eyepiece section of the endoscope, and a main eyepiece section to which the photographing device can be attached;
   a sub-eyepiece section connected to the body;
   light guide means having light dividing and transmitting members and housed in the body to be movable between a first position where the light dividing member is on the optical axis of the beam, which is sent from the endoscope into the body, to divide the beam and guide the divided beams to the main- and sub-eyepiece sections, and a second position where the light transmitting member is on the optical axis to guide all of the beam to the main eyepiece section; and changeover means arragned in the body to engage with the light guide means and to be engageable with the photographing device and serving to switch the light guide means to the second position, in accordance with the operation of attaching the photographing device to the main eyepiece section.

2. A co-viewing device according to claim 1, wherein said body includes a connecting sleeve which is fixed to the connecting portion at one end thereof, forms the main eyepiece section at the other end thereof and extendes coaxially with the optical axis of the beam which enters from the endoscope into the body, and the light guiding means has a support frame which supports the light dividing and transmitting members and which is supported by the connecting sleeve to be movable between the first and the second positions.

3. A co-viewing device according to claim 2, wherein said connecting sleeve has a through-hole extending in a direction perpendicular to its axis; the support frame has a flat portion movably inserted into the through-hole and having two ends projecting from the connecting sleeve, and an arc portion extending along the outer peripheral face of the connecting sleeve from both ends of the flat portion; and the light dividing and transmitting members are fixed on the flat portion and juxtaposed along the axial direction of the through-hole.

4. A co-viewing device according to claim 3, wherein said arc portion is made of elastic material.

5. A co-viewing device according to claim 2, wherein said changeover means includes an interlocking cylinder rotatably fitted onto the connecting sleeve, and the interlocking cylinder has one end which is located adjacent to the main eyepiece section and has an engaging portion engagable with the photographing device, and the other end engaged with the support frame, and the interlocking cylinder is rotated, in accordance with the attaching operation of the photographing device, to move the support frame to the second position.

6. A co-viewing device according to claim 5, wherein said changeover means includes a clutch mechanism which is located between the interlocking cylinder and the support frame and engaged with them to transmit the rotation of the interlocking cylinder to the support frame, and which further comprises an external operating means for moving the support frame independently of the rotation of the interlocking cylinder.

7. A co-viewing device according to claim 6, wherein said body has a housing fixed to the connecting portion to cover substantially the whole of the support frame and connecting sleeve, and the operating means has an operating knob rotatably attached to the housing and engaged with the support frame to move the frame when it is rotated.

8. A co-viewing device according to claim 6, wherein said operating means has operating buttons each extending outside from the support frame, through the housing.

9. A co-viewing device according to claim 6, wherein said clutch mechanism includes a first ring rotatably fitted onto the connecting sleeve and engaged with the other end of the interlocking cylinder, a first urging member for urging the first ring in a direction around the axis of the connecting sleeve, a second ring rotatably fitted onto the connecting sleeve between the first ring and the support frame and engaged with the first ring and support frame, and a second urging member for urging the second ring in a reverse direction to that of the first urged ring.

10. A co-viewing device according to claim 5, wherein said interlocking cylinder is divided to a first portion positioned on the side of the main eyepiece section and made of a very strong material, and a second portion positioned on the side of the support frame and made of a light material, and these portions are engaged with each other to make their rotation integral.

11. A co-viewing device according to claim 3, which further comprises a light guide cable connected to the sub-eyepiece section at one end thereof and to the body at the other end thereof, the other end of the cable being inserted into the connecting sleeve to oppose the flat portion of the support frame.

* * * * *